United States Patent
Azar et al.

(10) Patent No.: US 10,839,293 B2
(45) Date of Patent: Nov. 17, 2020

(54) NOISY NEURAL NETWORK LAYERS WITH NOISE PARAMETERS

(71) Applicant: DeepMind Technologies Limited, London (GB)

(72) Inventors: Mohammad Gheshlaghi Azar, London (GB); Meire Fortunato, London (GB); Bilal Piot, London (GB); Olivier Claude Pietquin, Lille (FR); Jacob Lee Menick, London (GB); Volodymyr Mnih, London (GB); Charles Blundell, London (GB); Remi Munos, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/439,026

(22) Filed: Jun. 12, 2019

(65) Prior Publication Data
US 2019/0362238 A1    Nov. 28, 2019

Related U.S. Application Data

(63) Continuation of application No. PCT/EP2018/063125, filed on May 18, 2018.
(Continued)

(51) Int. Cl.
*G06N 3/08*  (2006.01)
*G06N 3/04*  (2006.01)

(52) U.S. Cl.
CPC .......... *G06N 3/084* (2013.01); *G06N 3/0445* (2013.01)

(58) Field of Classification Search
CPC .............................. G06N 3/084; G06N 3/0445
See application file for complete search history.

(56) References Cited

U.S. PATENT DOCUMENTS

| | | | |
|---|---|---|---|
| 9,536,191 B1* | 1/2017 | Arel | G06N 3/08 |
| 2017/0140268 A1* | 5/2017 | van Hasselt | G06N 3/04 |
| 2018/0189325 A1* | 7/2018 | Hohwald | G06F 3/04817 |

OTHER PUBLICATIONS

Cheney et al. On the Robustness of Convolutional Neural Networks to Internal Architecture and Weight Perturbations. Mar. 23, 2017. (Year: 2017).*

(Continued)

*Primary Examiner* — Alexey Shmatov
*Assistant Examiner* — Robert Bejcek, II
(74) *Attorney, Agent, or Firm* — Fish & Richardson P.C.

(57) ABSTRACT

Methods, systems, and apparatus, including computer programs encoded on a computer storage medium, for selecting an action to be performed by a reinforcement learning agent. The method includes obtaining an observation characterizing a current state of an environment. For each layer parameter of each noisy layer of a neural network, a respective noise value is determined. For each layer parameter of each noisy layer, a noisy current value for the layer parameter is determined from a current value of the layer parameter, a current value of a corresponding noise parameter, and the noise value. A network input including the observation is processed using the neural network in accordance with the noisy current values to generate a network output for the network input. An action is selected from a set of possible actions to be performed by the agent in response to the observation using the network output.

22 Claims, 3 Drawing Sheets

Related U.S. Application Data (60) Provisional application No. 62/525,099, filed on Jun. 26, 2017, provisional application No. 62/509,059, filed on May 20, 2017.

(56) References Cited

OTHER PUBLICATIONS

Lu et al. Fast Learning with Noise in Deep Neural Nets. 2015. (Year: 2015).*
Auer et al, "Logarithmic online regret bounds for undiscounted reinforcement learning" Paper NIPS, 2007, 8 pages.
Azar et al, "Minimax regret bounds for reinforcement learning" arXjv, Jul. 2017, 29 pages.
Bellemare et al, "A distributional perspective on reinforcement learning" arXiv, Jul. 2017, 19 pages.
Bellemare et al, "The arcade learning environment" An evaluation platform for general agents Twenty-Fourth International Joint Conference on Artificial Intelligence, 2015, 5 pages.
Bellemare et al, "Unifying count-based exploration and intrinsic motivation" arXiv, Nov. 2016, 20 pages.
Bellman et al, "Dynamic programming and modern control theory", Academic Press New York, Jan. 1969, page count unknown.
Bertsekas, "Dynamic programming and optimal control", vol. 1, Athena Scientific, 1995, page count unknown.
Bishop, "Training with noise is equivalent to Tikhonov regularization" 7(1), Jan. 1995, 8 pages.
Blundell et al, "Weight uncertainity in neural networks," Proceeding of Machine Learning Research, Jul. 2015, 10 pages.
Fix et al, "Monte-Carlo swarm policy search", Swarm and Evolutionary Computation, Apr. 2012, 8 pages.
Fortunato et al, "Bayesian recurrent neural networks" arXiv, Apr. 2017, 11 pages.
Fortunato et al. "Noisy Networks for Exploration" ICLR, 2018.
Gal et al, "Dropout as a Bayesian Approximation: Representing Model Uncertainty in Deep Learning" arXiv, Oct. 2016, 10 pages.
Geist et al, "Kalman temporal differences" arXiv, Oct. 2010, 50 pages.
Geist et al, "Managing uncertainty within value function approximation in reinforcement learning", Journal of artificla intelligence research, May 2010, 8 pages.
Graves et al, "Practical variational intefence for neural networks", Advances in Neural Information Processing Systems, 2011, 9 pages.
Gulcehre et al, "Noisy activation functions," arXiv, Apr. 2016, 10 pages.
Hazen et al, "On graduated optimization for stochastic non-convex problems", International Conference on Machine Learning, 2016, 9 pages.
Hinton et al, "Keeping the neural networks simple by minimzing the desciption length of the weights" Proceedings of the sixth annual conference on Computational learning theory, Aug. 1993.
Hochreiter et al, "Flat minima" Neural Computation, 1997, 42 pages.
Houthooft et al, "VIME: Variational information maximizing exploration" arXiv, Nov. 2016, 9 pages.
Jaksch et al, "Near-optimal regret bounds for reinforcement learning" JMLR, Apr. 2010, 38 pages.
Kearns et al, "Near-optimal reinforcement learning in polynomial time" Machine Learning, 2002, 24 pages.
Lattimore et al, "The sample-complexity of general reinforcement learning" arXiv, Aug. 2013, 16 pages.
Li et al, "Learing weight uncertainty with stochastic gradient MCMC for shape classification," IEEE Xplore, Jun. 2016, 10 pages.
Lillicrap et al, "Continuous control with deep reinforcement learning" arXiv, Nov. 2015, 14 pages.
Lipton et al, "Efficient exploration for dialogue policy learning with BBQ networks & replay buffer spiking" arXiv, Sep. 2016, 9 pages.
McClure et al, "Representing inferential uncertainty in deep neural networks through sampling," arXiv, Feb. 2, 2017.
Minh et al, "Asynchronous methods for deep reinforcement learning" International Conference on Machine Learning, Jun. 2016, pp. 1928-1937.
"Human-level control through deep reinforcement learning" Nature, Feb. 2015, Luo, Guanheng.
Mobahi, "Training recurrent neural networks by diffusion" arXiv, Feb. 2016, 22 pages.
Moriarty et al. "Evolutionary algorithms for reinforcement learning" Journal of Artificial Intelligence Research, 1999, 11:241-276.
Neelakantan et al, "Adding gradient noise improves learning for very deep networks," arXiv, Nov. 2015, 11 pages.
Osband et al. "Deep exploration via bootstrapped DQN" In Advances in Neural Information Processing Systems, 2016, pp. 4026-4034.
Osband et al. "Deep exploration via randomized value functions" arXiv preprint arXiv:1703.07608, 2017.
Osband et al. "Generalization and exploration via randomized value functions" arXiv preprint arXiv:1402.0635, Feb. 2014.
Ostrovski et al. "Count-based exploration with neural density models" arXiv preprint arXiv:1703.01310, Jun. 2017.
Oudeyer et al. "What is intrinsic motivation? A typology of computational approaches" Frontiers in neurorobotics, Nov. 2007.
PCT International Search Report and Written Opinion in International Appln. PCT/EP2018/063125, dated Sep. 5, 2018, 16 pages.
Plappert et al. "Parameter space noise for exploration" arXiv preprint arXiv:1706.01905, 2017.
Puterman "Markov decision processes: discrete stochastic dynamics programming" John Wiley & Sons, 1994.
Rueckstiess et al, "State-dependent exploration for policy gradient methods," Technische Universitat Munchen, Sep. 2008, 16 pages.
Salimans et al. "Evolution Strategies as a Scalable Alternative to Reinforcement Learning" ArXiv e-prints, Sep. 2017.
Schmidhuber "Formal theory of creativity, fun, and intrinsic motivation (1990-2010)" IEEE Transactions on Autonomous Mental Development, 2010, 2(3):230-247.
Schulman et al. "Trust region policy optimization" In Proc. of ICML, 2015, pp. 1889-1897.
Singh et al. "Intrinsically motivated reinforcement learning" In NIPS, 2004, vol. 17, pp. 1281-1288.
Sutton et al. "Policy gradient methods for reinforcement learning with function approximation" In Proc. of NIPS, 1999, vol. 99, 99. 1057-1063.
Sutton et al. "Reinforcement learning: An introduction" Cambridge Univ Press, 1998.
Thompson "On the likelihood that one unkown probability exceeds another in view of the evidence of two samples" Biometrika, 1933, 25(3/4):285-294.
Van Hasselt et al. "Deep reinforcement learning with double q-learning" In Proc. of AAAI, 2016, pp. 2094-2100.
"Dueling network architectures for deep reinforcement learning" In Proceedings of the 33rd International Conference on Machine Learning, 2016, pp. 1995-2003, Labash, Aqeel.
Williams "Simple statistical gradient-following algorithms for connectionist reinforcement learning" Machine learning, 1992, 8(3-4):229-256.
PCT International Preliminary Report on Patentability in International Appln. PCT/EP2018/063125, dated Dec. 5, 2019, 10 pages.

* cited by examiner

NOISY NEURAL NETWORK LAYERS WITH NOISE PARAMETERS

CROSS-REFERENCE TO RELATED APPLICATIONS

This application is a continuation application of, and claims priority to, PCT Patent Application No. PCT/EP2018/063125, titled "NOISY NEURAL NETWORK LAYERS," filed on May 18, 2018, which application claims the benefit under 35 U.S.C. § 119(e) of U.S. Patent Application No. 62/525,099, entitled "NOISY NEURAL NETWORK LAYERS," filed Jun. 26, 2017 and U.S. Patent Application No. 62/509,059, entitled "NOISY NEURAL NETWORK LAYERS," filed May 20, 2017. The disclosure of each of the foregoing applications is incorporated herein by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a reinforcement learning system implemented as computer programs on one or more computers in one or more locations.

According to a first aspect there is provided a method of training a neural network. The neural network is configured to receive a network input and to process the network input to generate a network output. The neural network includes multiple layers each having respective layer parameters. One or more of the layers of the neural network are noisy layers. The method includes maintaining data specifying current values of each layer parameter of each layer and, for each layer parameter of each noisy layer, a current value of a corresponding noise parameter for the layer parameter. A training network input is obtained. For each layer parameter of each noisy layer, a respective noise value is determined. For each layer parameter of each noisy layer, a noisy current value for the layer parameter is determined from the current value of the layer parameter, the current value of the corresponding noise parameter, and the noise value. The training input is processed using the neural network in accordance with the noisy current values to generate a network output for the training input. A gradient of an objective function that depends on the network output is determined with respect to the current values of the layer parameters and the current values of the noise parameters. An update to the current values of the layer parameters and the current values of the noise parameters is determined from the gradient.

Some advantages of this approach are described later. In some implementations, determining, for each layer parameter of each noisy layer, a noisy current value for the layer parameter includes applying the noise parameter to the noise value to generate a noise modifier. The noise modifier and the current value are added to generate the noisy value for the layer parameter. For example a noisy current value for a layer parameter may be determined by an affine function of the noise parameter, noise value, and current parameter. These approaches facilitate noise perturbations which facilitate deep exploration, with few additional parameters.

In some implementations, determining, for each layer parameter of each noisy layer, a respective noise value includes sampling the noise value from a predetermined distribution.

In some implementations, determining, for each layer parameter of each noisy layer, a respective noise value includes, for each noisy layer, sampling a predetermined number of noise values from one or more predetermined distributions. For each layer parameter of each noisy layer, the noise value for the parameter is generated by combining two or more of the sampled noise values for the noisy layer. Merely by way of example the combining may be performed by determining a function of each of the sampled noise values and then determining a product of the functions.

The described techniques do not impose any constraints on the predetermined noise distributions (which in general do not have any learned parameters). Merely by way of example however, such a predetermined distribution may comprise a Normal distribution.

In some examples described later the current value of a layer parameter of a noisy layer is denoted by variable c; the current value of the corresponding noise parameter is a; the noise value is E; and the noisy current value of the layer parameter is n. In some example implementations a value for n may be determined using $n = c + \sigma \cdot \epsilon$.

In some implementations, the neural network is used to select actions to be performed by a reinforcement learning agent interacting with an environment.

In some implementations, the network input includes an observation characterizing a state of the environment and an action from a set of actions, and the network output is an estimate of a return received if the reinforcement learning agent performs the action in response to the observation.

In some implementations, the network input includes an observation characterizing a state of the environment and the network output defines a likelihood distribution over actions in a set of possible actions to be performed by the agent in response to the observation.

In some implementations, the multiple layers also include one or more layers that are not noisy layers. Processing the training input using the neural network includes processing the training input in accordance with the noisy current values and the current values of the layer parameters of the layers that are not noisy layers to generate the network output for the training input.

In some implementations, the one or more noisy layers include one or more fully-connected layers.

In some implementations, the one or more noisy layers include one or more convolutional layers.

In some implementations, the one or more noisy layers include one or more recurrent neural network layers.

According to a second aspect there is provided a method of selecting an action to be performed by a reinforcement learning agent interacting with an environment using a neural network. The neural network has multiple layers, each layer has multiple layer parameters. The multiple layers include one or more noisy layers. The method includes maintaining data specifying current values of each layer parameter of each layer and, for each layer parameter of each noisy layer, a current value of a corresponding noise parameter for the layer parameter. An observation characterizing a current state of the environment is obtained. A network input for the neural network including the observation is generated. For each layer parameter of each noisy layer, a respective noise value is determined. For each layer parameter of each noisy layer, a noisy current value for the layer parameter is determined from the current value of the layer parameter, the current value of the corresponding noise parameter, and the noise value. The network input is processed using the neural network in accordance with the noisy current values to generate a network output for the network input. An action is selected from a set of possible actions to be performed by the agent in response to the observation using the network output.

In some implementations, the network input further includes an action from the set of possible actions, and the network output is an estimate of a return received if the reinforcement learning agent performs the action in response to the observation.

In some implementations, the network output defines a likelihood distribution over the actions in the set of possible actions.

In some implementations, the network output identifies an action from the set of possible actions.

In some implementations, the objective function additionally depends on a target output for the training network input.

According to a third aspect, there is provided a system including one or more computers and one or more storage devices storing instructions that when executed by the one or more computers cause the one or more computers to perform the operations of the previously described methods.

According to a fourth aspect, there is provided one or more computer storage media storing instructions that when executed by one or more computers cause the one or more computers to perform the operations of the previously described methods.

Particular embodiments of the subject matter described in this specification can be implemented so as to realize one or more of the following advantages.

The reinforcement learning system as described in this specification selects actions to be performed by an agent interacting with an environment based on network outputs generated by a neural network. The neural network includes one or more noisy layers and generates network outputs by processing network inputs in accordance with noisy values for the noisy layer parameters. The noisy values for the noisy layer parameters are learnt perturbations of the current values of the noisy layer parameters by noise values. By generating network outputs in accordance with noisy values for the noisy layer parameters, the neural network drives the agent to explore the environment and thereby improves the performance of the agent in accomplishing tasks (e.g., navigating to goal locations in the environment).

In contrast to some conventional exploration strategies, such as $\epsilon$-greedy exploration strategies, the exploration strategy implemented by the system as described in this specification (i.e., through the noisy layers of the neural network) depends on the state of the environment at each time step. This can enable the agent to explore more efficiently by exploring more actively when the state of the environment is a state which has been observed less frequently than other states. Exploring more actively refers to performing actions that are more likely to be different than the actions that would be selected to be performed in the absence of the exploration strategy. That is, exploring more actively refers to performing actions that are more likely to be different than the actions that would be selected to be performed based on network outputs generated by the neural network in accordance with the current values of noisy layer parameters (rather than the noisy values of noisy layer parameters).

In a reinforcement learning system as described in this specification a change to a weight vector can produce a complex, state-dependent change in policy over multiple time steps. Thus the system can provide a structured transformation of weight noise into policy change which, with few additional parameters and little computational cost, facilitates deep exploration and hence faster training and improved final outcomes. In some implementations a weight perturbation (noise values and noise parameters) may be fixed for multiple time steps before updating weights (layer parameters and noise parameters). In some implementations the noise distribution is learned using the gradient updates from a reinforcement learning objective.

The exploration strategy implemented by the system as described in this specification can be directly learnt from the experience of the agent in interacting with the environment. More specifically, the values of the noise parameters that govern how strongly the noisy values for noisy layer parameters are perturbed from the current values of the noisy layer parameters are automatically adjusted during training by gradients of the same objective function used to train the layer parameters of the neural network. Therefore, the system can automatically learn to adapt how actively the agent explores the environment. For example, as the system learns more about the environment, the values of the noise parameters can be automatically adjusted to reduce how actively the agent explores, thereby enabling the system to more effectively exploit information learnt about the environment in previous exploration. In contrast, some conventional exploration strategies (e.g., $\epsilon$-greedy exploration strategies) do not include any mechanism for learning how to explore from the experience of the agent in interacting with the environment.

Moreover, the exploration strategy implemented by the system as described in this specification need not require modifying the objective function used to train the neural network. In contrast, some conventional exploration strategies modify the objective function, for example, by adding a term to the objective function that encourages the action selection policy to be more entropic. By modifying the objective function, these conventional exploration strategies may cause the action selection policy learnt by the system during training to select actions that do not optimize the return received by the system, and by extension, do not optimize the performance of the agent in completing tasks. Therefore, the exploration strategy implemented by the system as described in this specification may cause the system to learn an action selection policy that results in the selection of actions that cause the agent to perform tasks more effectively than systems using some conventional exploration strategies.

Due at least to the previously described advantages, a system implementing the exploration strategy as described in this specification can be trained to achieve an acceptable level of performance more rapidly than systems implementing conventional exploration strategies. Therefore, a system implementing the exploration strategy as described in this specification may consume fewer computational resources (e.g., memory and computing power) during training than systems implementing conventional exploration strategies.

In a particular example, the reinforcement learning system as described in this specification can select actions to be performed by a robot (e.g., a mechanical agent) interacting with a real-world environment. For example, the robot may be performing tasks in a manufacturing environment (e.g., assembling electrical components) or in a warehouse environment (e.g., transporting packages in a warehouse). By selecting the actions to be performed by the robot using a reinforcement learning system as described in this specification, the robot may be trained to achieve an acceptable level of performance more quickly and may adapt to previously unseen environmental conditions more readily than if the actions to be performed by the robot were selected by a conventional system.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
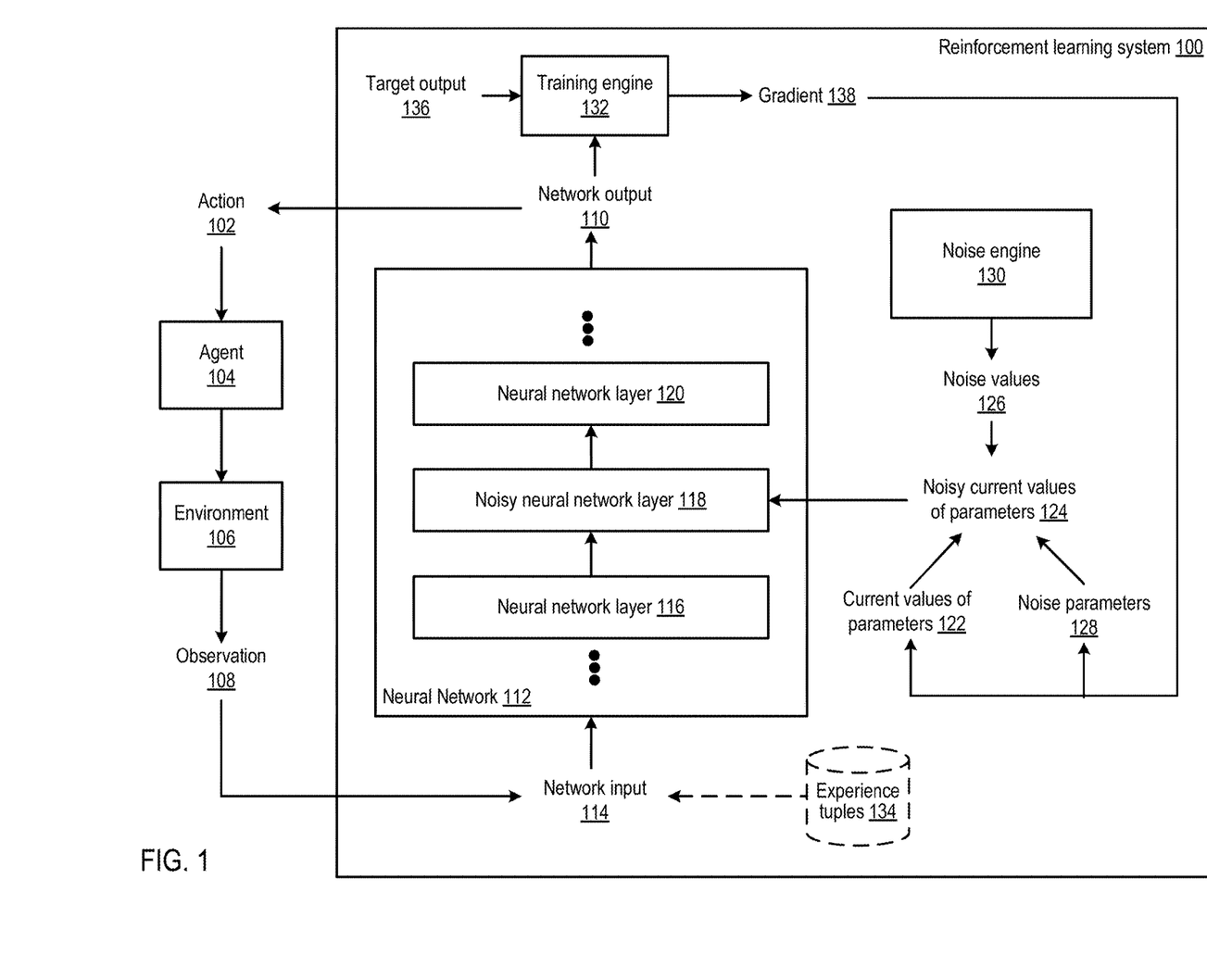
FIG. 1 is an illustration of an example neural network system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions 102 to be performed by an agent 104 interacting with an environment 106 at each of multiple time steps. At each time step, the system 100 receives data characterizing the current state of the environment 106, e.g., an image of the environment 106, and selects an action 102 to be performed by the agent 104 in response to the received data. Data characterizing a state of the environment 106 will be referred to in this specification as an observation 108.

The system 100 described herein is widely applicable and is not limited to one specific implementation. However, for illustrative purposes, a small number of example implementations are described below.

In some implementations, the environment 106 is a real-world environment and the agent 104 is a mechanical agent interacting with the real-world environment. For example, the agent 104 may be a robot interacting with the environment 106 to accomplish a specific task. As another example, the agent 104 may be an autonomous or semi-autonomous vehicle navigating through the environment 106. In these implementations, the actions 102 may be control inputs to control the robot or the autonomous vehicle. In some of these implementations, the observations 108 may be generated by or derived from sensors of the agent 104. For example, the observations 108 may be captured by a camera of the agent 104. As another example, the observations 108 may be derived from data captured from a laser sensor of the agent 104. As another example, the observations 108 may be hyperspectral images captured by a hyperspectral sensor of the agent 104.

In some implementations, the environment 106 is an industrial facility and the agent 104 is a control system for the industrial facility. For example, the agent 104 may be a temperature control system controlling the temperature of a data center. In this example, the actions 102 may be control inputs to control the temperature of the data center, such as control inputs governing the rotational speed of the blades of fans that cool the data center.

In some implementations, the environment 106 may be a simulated environment and the agent 104 may be implemented as one or more computer programs interacting with the simulated environment. For example, the simulated environment 106 may be a video game and the agent 104 may be a simulated user playing the video game. As another example, the simulated environment 106 may be a motion simulation environment, e.g., a driving simulation or a flight simulation, and the agent 104 is a simulated vehicle navigating through the motion simulation environment. In these implementations, the actions 102 may be control inputs to control the simulated user or simulated vehicle.

At each time step, the state of the environment 106 at the time step (as characterized by the observation 108) depends on the state of the environment 106 at the previous time step and the action 102 performed by the agent 104 at the previous time step.

At each time step, the system 100 may receive a reward based on the current state of the environment 106 and the action 102 of the agent 104 at the time step. In general, the reward is a numerical value. The reward can be based on any event or aspect of the environment 106. For example, the reward may indicate whether the agent 104 has accomplished a task (e.g., navigating to a target location in the environment 106) or the progress of the agent 104 towards accomplishing a task.

At each time step, the system 100 selects the action 102 to be performed by the agent 104 at the time step using a network output 110 generated by a neural network 112 by processing a network input 114. The network input 114 includes the observation 108 characterizing the state of the environment 106 at the time step, and in some implementations (as will be described in more detail later), an action from a set of possible actions that can be performed by the agent 104.

In some implementations, the network output 110 defines a likelihood distribution over actions in the set of possible actions. For example, the network output 110 may include a respective numerical likelihood value for each action in the set of possible actions. In some of these implementations, the system 100 selects the action 102 to be performed by the agent 104 by sampling an action from the set of possible actions based on the likelihood distribution. For example, the system 100 may process the likelihood values defining the likelihood distribution by a soft-max function to determine a probability distribution over the set of possible actions. After determining a probability distribution over the set of possible actions, the system 100 may select the action 102 to be performed by the agent 104 by sampling an action from the set of possible actions in accordance with the probability distribution. As another example, the network output 110 may include respective numerical values defining the parameters of a parametric probability distribution (e.g., the mean and standard deviation of a Normal distribution). In this example, the set of possible actions may be a continuous set (e.g., a continuous range of real numbers). The system 100 may select the action 102 to be performed by the agent 104 by sampling an action from the set of possible actions based on the parametric probability distribution defined by the network output 110.

In some implementations, the network output 110 identifies an action from the set of possible actions. For example, if the agent 104 is a robotic agent, the network output 110 may identify the torques to be applied to the joints of the agent 104. In some of these implementations, the system 100 selects the action identified by the network output 110 as the action 102 to be performed by the agent 104.

In some implementations, the network input includes both the observation 108 and a given action from the set of possible actions, and the network output 110 is an estimate of a return that will be received by the system 100 if the agent 104 performs the given action in response to the observation 108. A return refers to a cumulative measure of reward received by the system 100 as the agent 104 interacts with the environment 106 over multiple time steps. For example, a return may refer to a long-term time-discounted reward received by the system 100. In some of these implementations, for each action in the set of possible actions, the system 100 provides a network input 114 to the neural network 112 that includes the action and the observation 108 characterizing the state of the environment at the time step. For each action in the set of possible actions, the neural network 112 processes the network input 114 including the action and the observation 108 to generate an estimate of a return that will be received by the system 100 if the agent 104 performs the action in response to the observation 108. The system may select the action 102 to be performed by the agent 104 at the time step to be the action with the highest estimated return from amongst all the actions in the set of possible actions.

The neural network 112 includes multiple neural network layers (e.g., the neural network layers 116, 118, and 120). The neural network layers include one or more noisy neural network layers (e.g., the noisy neural network layer 118) and, optionally, one or more conventional neural network layers.

Both noisy neural network layers and conventional neural network layers are configured to receive layer inputs and to process the layer inputs in accordance with one or more layer parameters to generate layer outputs. For example, the layer parameters may define a weight matrix and a bias vector. In this example, the layer may process a layer input to generate a layer output by multiplying the layer input (e.g., represented as a vector of numerical values) by the weight matrix and adding the bias vector to the result. Both noisy layers and conventional layers may be implemented as fully-connected layers, convolutional layers, recurrent layers, or in any other configuration.

While conventional layers process layer inputs in accordance with current values of layer parameters 122, noisy layers process layer inputs in accordance with noisy current values of layer parameters 124. The system 100 determines the noisy current values of the layer parameters 124 of noisy layers by randomly perturbing the current values of the layer parameters 122 of the noisy layers. More specifically, for a given noisy layer, the system 100 determines the noisy current values of the layer parameters 124 of the noisy layer by randomly perturbing the current values of the layer parameters 122 using: (i) random noise values 126 for the noisy layer, and (ii) the current values of noise parameters 128 for the noisy layer. As will be described further with reference to FIG. 2, each noise parameter 128 corresponds to a respective layer parameter of a noisy layer. The current value of a noise parameter 128 may govern how different the noisy current value of the corresponding layer parameter 124 can be from the current value of the corresponding layer parameter 122. The system 100 determines the noise values 126 for the layer parameters of noisy layers by a noise engine 130. The noise engine 130 determines the noise values 126 by sampling from one or more probability distributions (as will be described further below with reference to FIG. 2).

The system 100 maintains data specifying the current values of each layer parameter 122 of each layer of the neural network 112 and, for each layer parameter of each noisy layer, a current value of a corresponding noise parameter 128 for the layer parameter. The system 100 can maintain the data specifying the current values of the layer parameters 122 and the current values of the noise parameters 128 in, for example, a physical data storage device or a logical data storage area.

The system 100 includes a training engine 132 that is configured to train the neural network 112 over multiple training iterations. The training engine 132 trains the neural network 112 by iteratively (i.e., at each training iteration) adjusting the current values of the layer parameters 122 and the current values of the noise parameters 128. By training the neural network 112, the training engine 132 may cause the neural network 112 to generate network outputs 110 that result in the selection of actions 102 to be performed by the agent 104 which increase a cumulative measure of reward received by the system 100. By increasing the cumulative measure of reward received by the system 100 (e.g., a long-term time-discounted reward), the training engine 132 causes the agent 104 to perform given tasks more effectively.

The training engine 132 trains the neural network 112 based on training data including a set of multiple experience tuples 134. Each experience tuple includes data indicating: (i) an observation, (ii) an action performed by the agent 104 in response to the observation, (iii) a reward received in response to the agent performing the action, and (iv) a next observation characterizing a state that the environment transitioned into as a result of the agent performing the action. The set of experience tuples 134 may include online experience tuples, offline experience tuples, or both. An online experience tuple refers to an experience tuple where the action included in the experience tuple was selected based on a network output 110 generated by the neural network 112 in accordance with the current values of the layer parameters 122 and the current values of the noise parameters 128. Conversely, an offline experience tuple refers to an experience tuple where the action included in the experience tuple may not have been selected based on a network output 110 generated by the neural network 112 in accordance with the current values of the layer parameters 122 and the current values of the noise parameters 128. For example, the action included in an offline experience tuple may have been selected based on a network output 110 generated by the neural network 112 in accordance with previous values of the layer parameters and previous values of the noise parameters (i.e., values that have since been adjusted during training).

At each training iteration, the training engine 132 selects an experience tuple and obtains a training network input 114 from the experience tuple. For example, when the neural network 112 is configured to receive a network input including an observation and an action, the training engine 132 may use the observation-action pair included in the experience tuple as the training network input 114. The system 100 determines the noisy current values 124 for the layer parameters of the noisy layers of the neural network 112, and the training engine 132 provides the training network input 114 to the neural network 112. The neural network 112 processes the training network input 114 in accordance with the noisy current values 124 of the noisy layer parameters to generate a network output 110 for the training network input 114.

Next, the training engine 132 determines a gradient 138 of a loss function that depends on the network output 110 (and in some cases, a target output 136) with respect to the current values of the layer parameters 122 and the current values of the noise parameters 128. Generally, the target output 136 is a network output that should be generated by the neural network 112 in response to processing the training network input 114. The training engine 132 uses the gradient 138 to update the current values of the layer parameters 122 and the current values of the noise parameters 128, as will be described further with reference to FIG. 3.

The system 100 drives exploration by selecting actions 102 to be performed by the agent 104 based on network outputs 110 generated by the neural network 112 in accordance with noisy current values of layer parameters 124. Exploration refers to a process by which the system 100 selects actions 102 to be performed by the agent 104 which are different from the actions that would be selected based network outputs generated by the neural network 112 in accordance with the current values of the layer parameters 122 of the neural network 112.

By exploring, the system 100 can learn more about the environment 106 and thereby potentially learn to select actions 102 that cause the agent 104 to accomplish tasks more effectively. More specifically, by exploring, the system 100 can generate experience tuples which may represent previously unknown information about the environment 106. The training engine 132 can train the neural network 112 using these experience tuples 134, thereby enabling the neural network 112 to exploit the previously unknown information about the environment 106 to generate network outputs 110 that result in the agent 104 performing actions 102 that accomplish tasks more effectively.

By adjusting the current values of the noise parameters 128 at each training iteration, the training engine 132 adaptively adjusts the amount of exploration performed. For example, as the system 100 learns more about the environment 106, the training engine 132 can adjust the current values of the noise parameters 128 to reduce the amount of exploration performed.

Figure 2:
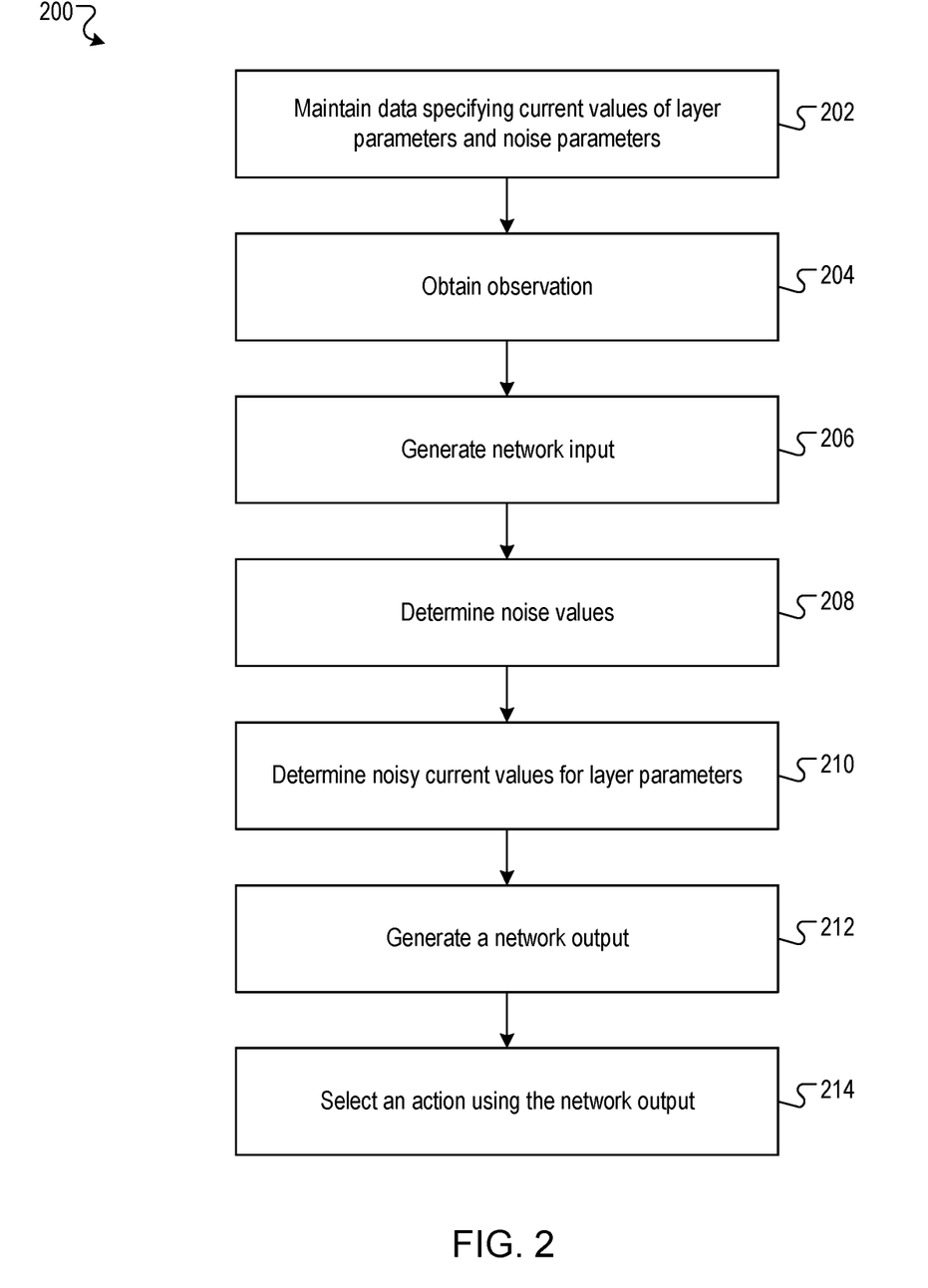
FIG. 2 is a flow diagram of an example process for selecting an action to be performed by an agent using a neural network with one or more noisy layers.

FIG. 2 is a flow diagram of an example process for selecting an action to be performed by an agent interacting with an environment using a neural network with one or more noisy layers. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system maintains data specifying the current values of each layer parameter of each layer of the neural network and, for each layer parameter of each noisy layer, a current value of a corresponding noise parameter for the layer parameter (202). The system can maintain the data specifying the current values of the layer parameters and the current values of the noise parameters in, for example, a physical data storage device or a logical data storage area.

The system obtains an observation characterizing a current state of the environment (204). For example, the environment may be a real-world environment or a simulated environment, and the observation may be generated by or derived from sensors of the agent. In particular examples, the observations may be: (i) images captured by a camera of the agent, (ii) data captured from a laser sensor of the agent, or (iii) hyperspectral images captured by a hyperspectral sensor of the agent.

The system generates a network input for the neural network (206). Generally, the network input includes a numerical representation (e.g., as a vector or a matrix) of the observation (i.e., as obtained in 204). For example, if the observation is an image captured by a camera of the agent, the network input may include a matrix of values representing the colors and intensities of the pixels of the image. In some implementations, the neural network is configured to receive a network input that additionally includes a numerical representation of an action from a set of possible actions that can be performed by the agent. In these implementations, the system may generate the network input by concatenating (or otherwise combining) the numerical representations of the observation and a numerical representation of an action. A numerical representation of a particular action may be a one-hot representation of the particular action. A one-hot representation of a particular action is defined by a vector that includes a different component for each action in the set of possible actions, where the component of the vector corresponding to the particular action has value one, and the other components have value zero.

The system determines a respective noise value for each layer parameter of each noisy layer (208). Generally, the noise values are random values which the system determines by sampling from one or more probability distributions. The system may determine a sample from a probability distribution by any appropriate random or pseudo-random number sampling technique (e.g., inverse transform sampling).

In some implementations, the system samples a respective noise value for each layer parameter of each noisy layer by independently sampling from a predetermined probability distribution. For example, the probability distribution may be a uniform distribution over a predetermined range. As another example, the probability distribution may be a Normal distribution with a predetermined mean (typically, zero) and standard deviation.

In some implementations, for each noisy layer, the system samples a predetermined number of noise values from one or more predetermined probability distributions. For each layer parameter of each noisy layer, the system may determine the noise value for the layer parameter by combining two or more of the sampled noise values for the noisy layer. For example, the layer parameters of a noisy layer may define a q×p weight matrix (i.e., a weight matrix with q rows and p columns) and a q×1 bias vector (i.e., a bias vector with q components). In this example, the system may sample a total of q+p noise values (e.g., from a Normal distribution) denoted by $\{\epsilon_i\}_{i=1}^q$ and $\{\epsilon'_j\}_{j=1}^p$. Next, the system may determine the noise value $\epsilon_{i,j}^w$ for the (i, j) entry of the weight matrix to be:

$$\epsilon_{i,j}^w = f(\epsilon_i) \cdot g(\epsilon'_j) \qquad (1)$$

and the system may determine the noise value $\epsilon_i^b$ for the i-th entry of the bias vector to be:

$$\epsilon_i^b = h(\epsilon_i) \qquad (2)$$

where $f(\cdot)$, $g(\cdot)$, and $h(\cdot)$ are arbitrary functions. For example, for any input x, $f(\cdot)$, $g(\cdot)$, and $h(\cdot)$ may generate an output as:

$$f(x)=g(x)=h(x)=\sqrt{x}\cdot\text{sgn}(x) \quad (3)$$

where $\text{sgn}(\cdot)$ is a function that outputs 1 if its input is a positive value, and outputs −1 otherwise. In this example, the system must maintain only q+p noise parameters for the noisy layer, instead of q×p+q noise parameters (as would be the case if the system sampled a different noise value for each layer parameter). In this manner, the complexity of the system may be reduced, thus potentially enabling the system to be trained more efficiently (e.g., over fewer training iterations).

The system determines a noisy current value for each layer parameter of each noisy layer (210). More specifically, the system determines a noisy current value for each layer parameter of each noisy layer from: (i) the current value of the layer parameter, (ii) the current value of the corresponding noise parameter, and (iii) the noise value for the layer parameter. For example, the system may determine the noisy current value n for a layer parameter of a noisy layer as:

$$n=c+\sigma\cdot\epsilon \quad (4)$$

where c is the current value of the layer parameter, σ is the current value of the noise parameter corresponding to the layer parameter, and ε is the noise value for the layer parameter. In a particular example, if the layer parameters of a noisy layer define a weight matrix w and a bias vector b, then the system may determine the noisy current values of the weight matrix w and the bias vector b as:

$$w=\mu+\sigma\odot\epsilon \quad (5)$$

$$b=\mu^b+\sigma^b\odot\epsilon^b \quad (6)$$

where μ denotes the current values of the weight matrix, σ denotes a matrix of noise parameters, ⊙ denotes the element-wise product, ε denotes a matrix of noise values, $\mu^b$ denotes the current values of the bias vector, $\sigma^b$ denotes a vector of noise parameters, and $\epsilon^b$ denotes a vector of noise values.

The system generates a network output by processing the network input using the neural network and in accordance with the noisy current values of the layer parameters of the noisy layers (212). In processing the network input, each neural network layer receives a respective layer input and processes the layer input by the layer parameters to generate a layer output. The conventional layers process layer inputs in accordance with the current values of their layer parameters, whereas the noisy layers process layer inputs in accordance with the noisy current values of their layer parameters (i.e., as determined in 210). Both the noisy layers and any conventional layers may be implemented as fully-connected layers, convolutional layers, recurrent layers, or in any other configuration.

The system selects an action to be performed by the agent using the network output (214). In some implementations, the network output defines a likelihood distribution over actions in the set of possible actions. For example, the network output may include a respective numerical likelihood value for each action in the set of possible actions. In some of these implementations, the system selects the action to be performed by the agent by sampling an action from the set of possible actions based on the likelihood distribution. For example, the system may process the likelihood values defining the likelihood distribution by a soft-max function to determine a probability distribution over the set of possible actions. After determining a probability distribution over the set of possible actions, the system may select the action to be performed by the agent by sampling an action from the set of possible actions in accordance with the probability distribution. As another example, the network output may include respective numerical values defining the parameters of a parametric probability distribution (e.g., the mean and standard deviation of a Normal distribution). In this example, the set of possible actions may be a continuous set (e.g., a continuous range of real numbers). The system may select the action to be performed by the agent by sampling an action from the set of possible actions based on the parametric probability distribution defined by the network output.

In some implementations, the network output identifies an action from the set of possible actions. For example, if the agent is a robotic agent, the network output may identify the torques to be applied to the joints of the agent. In some of these implementations, the system selects the action identified by the network output as the action to be performed by the agent.

In some implementations, the network input includes both the observation and a given action from the set of possible actions, and the network output is an estimate of a return (e.g., a long-term time-discounted reward) that will be received by the system if the agent performs the given action in response to the observation. In some of these implementations, for each action in the set of possible actions, the system generates a network input that includes the action and the observation (as described with reference to 206). For each action in the set of possible actions, the neural network processes the network input including the action and the observation to generate an estimate of a return that will be received by the system if the agent performs the action in response to the observation. The system may select the action to be performed by the agent at the time step to be the action with the highest estimated return from amongst all the actions in the set of possible actions.

By incorporating one or more noisy layers, the system obviates the need for conventional exploration strategies, such as ε-greedy exploration strategies. In an ε-greedy exploration strategy, the system selects the action to be performed by the agent based on the network output with probability 1−ε, and selects the action randomly from the set of possible actions with probability E (where E is a number between 0 and 1). In contrast, by including one or more noisy layers, the neural network as described in this specification generates a network output that inherently incorporates an exploration strategy.

Figure 3:
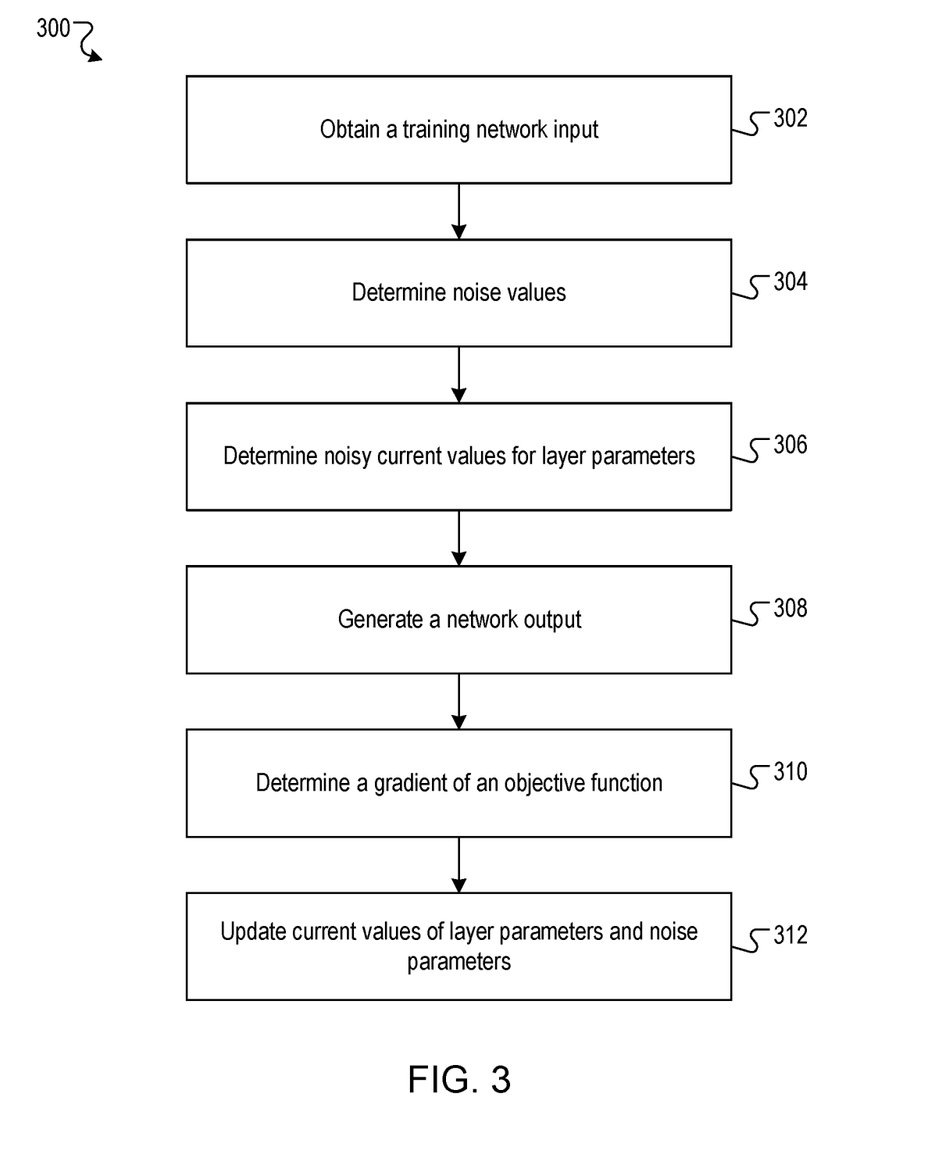
FIG. 3 is a flow diagram of an example process for training a neural network with one or more noisy layers.

FIG. 3 is a flow diagram of an example process for training a neural network with one or more noisy layers. More specifically, FIG. 3 is a flow diagram of one iteration of an iterative process for training a neural network with one or more noisy layers that is performed at each of multiple training iterations. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 300.

The system obtains a training network input (302). More specifically, the system selects an experience tuple and obtains a training network input from the experience tuple. As described earlier, an experience tuple includes data indicating: (i) an observation, (ii) an action performed by the agent 104 in response to the observation, (iii) a reward received in response to the agent performing the action, and (iv) a next observation characterizing a state that the environment transitioned into as a result of the agent performing the action. The experience tuple may be an online experience tuple or an offline experience tuple. The system may select the experience tuple from a set of experience tuples, for example, by randomly sampling an experience tuple from the set of experience tuples. The system determines the training network input based on the observation included in the experience tuple. When the neural network is configured to receive a network input that further includes an action, then the system may further determine the training network input based on the action included in the experience tuple (as described with reference to 206).

Generally, the system may obtain multiple training network inputs and perform the steps of the process 300 with respect to each training network input at each training iteration. However, for brevity, the process 300 will be described with reference to a single training network input.

The system determines a respective noise value for each layer parameter of each noisy layer of the neural network (304). Generally, the noise values are random values which the system determines by sampling from one or more probability distributions. Determining noise values for the layer parameters of the noisy layers is described further with reference to 208.

The system determines a noisy current value for each layer parameter of each noisy layer of the neural network (306). More specifically, the system determines a noisy current value for each layer parameter of each noisy layer from: (i) the current value of the layer parameter, (ii) the current value of the corresponding noise parameter, and (iii) the noise value for the layer parameter. Determining noisy current values for the layer parameters of the noisy layers is described further with reference to 210.

The system generates a network output by processing the network input using the neural network and in accordance with the noisy current values of the layer parameters of the noisy layers (308). In processing the network input, each neural network layer receives a respective layer input and processes the layer input by the layer parameters to generate a layer output. The conventional layers process layer inputs in accordance with the current values of their layer parameters, whereas the noisy layers process layer inputs in accordance with the noisy current values of their layer parameters.

In some reinforcement learning implementations, the network output defines a likelihood distribution over actions in the set of possible actions. In some reinforcement learning implementations, the network output identifies an action from the set of possible actions. In some implementations, for example actor-critic reinforcement learning systems, the network input includes both the observation and a given action from the set of possible actions that can be performed by the agent, and the network output is an estimate of a return (e.g., a long-term time-discounted reward) that will be received by the system if the agent performs the given action in response to the observation.

In some implementations the system determines a gradient of an objective function that depends on the network output (and in some cases, a target output for the training network input) with respect to the current values of the layer parameters and the current values of the noise parameters (310). For example, the objective function may be given by:

$$\mathcal{L}(\theta) = (y - Q(s, a; \theta))^2 \qquad (7)$$

where θ denotes the layer parameters and the noise parameters, y is the target output, and Q(s, a; θ) denotes a network output which is an estimate of a return that will be received by the system if the system performs the action a in response to the observation s. In this example, the neural network processed a network input including the action a and the observation s which are obtained from the selected experience tuple (e.g., as described in 302). The system may determine the target output y as:

$$y = r + \gamma \cdot \max_{b \in A} Q(s', b; \theta) \qquad (8)$$

where r denotes the reward included in the selected experience tuple, γ denotes a discount factor (typically, a number between 0 and 1), A denotes the set of possible actions that can be performed by the agent, and Q (s', b; θ) denotes a network output which is an estimate of a return that will be received if the system performs the action b in response to the observation s'. In this example, s' is the next observation included in the selected experience tuple and the system determines Q(s', b; θ) by using the neural network to process a network input including the action b and the observation s'.

In some cases, the system determines Q(s', b; θ) by using a target neural network to process a network input including the action b and the observation s'. The target neural network has the same architecture as the neural network but potentially has different current values of layer parameters, different current values of noise parameters, and different noisy current values of layer parameters. The system may periodically update the current values of the layer parameters and the current values of the noise parameters of the target network to be the same as the current values of the layer parameters and the current values of the noise parameters of the neural network.

As another example, the objective function may be given by:

$$\mathcal{L}(\theta) = \mathbb{E}[R] \qquad (9)$$

where $\mathbb{E}[\cdot]$ denotes the probabilistic expectation operator and R denotes a return received by the system (e.g., a long-term time-discounted reward). The system can determine the gradient of the objective function by a backpropagation procedure or by any other appropriate method. In some on-policy implementations of a reinforcement learning (RL) system of this type the noise parameters and noise values may be fixed during a roll-out from a state when estimating a reward so that the RL policy does not change during this time. The layer parameters and noise parameters may then be updated after the roll-out.

The system updates the current values of the layer parameters and the current values of the noise parameters using the gradient (312). For a given parameter θ of the neural network (e.g., a layer parameter or a noise parameter), the system may update the current value of the parameter by:

$$\theta \leftarrow \theta - r \cdot \nabla_\theta \mathcal{L} \qquad (4)$$

where r is a positive learning rate hyper-parameter (i.e., a system hyper-parameter governing how quickly parameter values can change during training) and $\nabla_\theta \mathcal{L}$ is the gradient of the objective function with respect to the parameter θ (e.g., as determined in 310).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network,
wherein the neural network is configured to receive a network input and to process the network input to generate a network output,
wherein the neural network comprises a plurality of layers each having respective layer parameters,
wherein one or more of the layers are noisy layers, and
wherein the method comprises:
maintaining data specifying: (i) current values of each layer parameter of each of the plurality of layers and, (ii) for each layer parameter of each noisy layer, a current value of a corresponding noise parameter for the layer parameter in addition to the current value of the layer parameter;
obtaining a training network input;
determining, for each layer parameter of each noisy layer, a respective noise value based at least in part on a respective random value that is sampled in accordance with a probability distribution;
determining, for each layer parameter of each noisy layer, a noisy current value for the layer parameter from: (i) the current value of the layer parameter, (ii) the current value of the corresponding noise parameter, and (iii) the noise value, comprising:
generating a noise modifier based on the current value of the corresponding noise parameter and the noise value; and
applying the noise modifier to the current value of the layer parameter to determine the noisy current value for the layer parameter;
processing the training input using the neural network in accordance with the noisy current values to generate a network output for the training input;
determining a gradient of an objective function that depends on the network output with respect to the current values of the layer parameters and the current values of the noise parameters; and
determining an update to the current values of the layer parameters and the current values of the noise parameters from the gradient.

2. The method of claim 1, wherein
applying the noise modifier to the current value of the layer parameter to determine the noisy current value for the layer parameter comprises:
adding the noise modifier and the current value of the layer parameter to generate the noisy current value for the layer parameter.

3. The method of claim 1, wherein determining, for each layer parameter of each noisy layer, a respective noise value based at least in part on a respective random value that is sampled in accordance with a probability distribution comprises:
for each noisy layer, sampling a predetermined number of random values from one or more predetermined probability distributions; and
for each layer parameter of each noisy layer, generating the noise value for the layer parameter by combining two or more of the sampled random values for the noisy layer.

4. The method of claim 1, further comprising selecting an action to be performed by a reinforcement learning agent interacting with an environment based on the network output.

5. The method of claim 4, wherein the objective function comprises a reinforcement learning objective function.

6. The method of claim 4, wherein the network input comprises an observation characterizing a state of the environment and an action from a set of actions, and wherein the network output is an estimate of a return received if the reinforcement learning agent performs the action in response to the observation.

7. The method of claim 4, wherein the network input comprises an observation characterizing a state of the environment and the network output defines a likelihood distribution over actions in a set of possible actions to be performed by the agent in response to the observation.

8. The method of claim 1, wherein the plurality of layers also includes one or more layers that are not noisy layers, and wherein processing the training input using the neural network comprises processing the training input in accordance with the noisy current values and the current values of the layer parameters of the layers that are not noise layers to generate the network output for the training input.

9. The method of claim 1, wherein the one or more noisy layers include one or more fully-connected layers.

10. The method of claim 1, wherein the one or more noisy layers include one or more convolutional layers.

11. The method of claim 1, wherein the one or more noisy layers include one or more recurrent neural network layers.

12. A method of selecting an action to be performed by a reinforcement learning agent interacting with an environment using a neural network, the neural network having a plurality of layers, each layer having a plurality of layer parameters, and the plurality of layers including one or more noisy layers, the method comprising:
  maintaining data specifying: (i) current values of each layer parameter of each of the plurality of layers and, (ii) for each layer parameter of each noisy layer, a current value of a corresponding noise parameter for the layer parameter in addition to the current value of the layer parameter;
  obtaining an observation characterizing a current state of the environment;
  generating a network input for the neural network comprising the observation;
  determining, for each layer parameter of each noisy layer, a respective noise value based at least in part on a respective random value that is sampled in accordance with a probability distribution;
  determining, for each layer parameter of each noisy layer, a noisy current value for the layer parameter from: (i) the current value of the layer parameter, (ii) the current value of the corresponding noise parameter, and (iii) the noise value, comprising:
    generating a noise modifier based on the current value of the corresponding noise parameter and the noise value; and
    applying the noise modifier to the current value of the layer parameter to determine the noisy current value for the layer parameter;
  processing the network input using the neural network in accordance with the noisy current values to generate a network output for the network input; and
  selecting an action from a set of possible actions to be performed by the agent in response to the observation using the network output;
  wherein for each noisy layer, the layer parameters and the corresponding noise parameters have been trained to maximize a cumulative measure of rewards received by selecting actions to be performed by the reinforcement learning agent using network outputs generated by the neural network.

13. The method of claim 12, wherein the network input further comprises a given action from the set of possible actions, and wherein the network output is an estimate of a return received if the reinforcement learning agent performs the given action in response to the observation.

14. The method of claim 12, wherein the network output defines a likelihood distribution over the actions in the set of possible actions.

15. The method of claim 12, wherein the network output identifies the action from the set of possible actions.

16. The method of claim 1, wherein the objective function additionally depends on a target output for the training network input.

17. A system comprising one or more computers and one or more storage devices storing instructions that when executed by the one or more computers cause the one or more computers to perform operations for training a neural network,
  wherein the neural network is configured to receive a network input and to process the network input to generate a network output,
  wherein the neural network comprises a plurality of layers each having respective layer parameters,
  wherein one or more of the layers are noisy layers, and wherein the operations comprise:
    maintaining data specifying: (i) current values of each layer parameter of each of the plurality of layers and, (ii) for each layer parameter of each noisy layer, a current value of a corresponding noise parameter for the layer parameter in addition to the current value of the layer parameter;
    obtaining a training network input;
    determining, for each layer parameter of each noisy layer, a respective noise value based at least in part on a respective random value that is sampled in accordance with a probability distribution;
    determining, for each layer parameter of each noisy layer, a noisy current value for the layer parameter from: (i) the current value of the layer parameter, (ii) the current value of the corresponding noise parameter, and (iii) the noise value, comprising:
      generating a noise modifier based on the current value of the corresponding noise parameter and the noise value; and
      applying the noise modifier to the current value of the layer parameter to determine the noisy current value for the layer parameter;
    processing the training input using the neural network in accordance with the noisy current values to generate a network output for the training input;
    determining a gradient of an objective function that depends on the network output with respect to the current values of the layer parameters and the current values of the noise parameters; and
    determining an update to the current values of the layer parameters and the current values of the noise parameters from the gradient.

18. The system of claim 17, wherein
  applying the noise modifier to the current value of the layer parameter to determine the noisy current value for the layer parameter comprises:

adding the noise modifier and the current value of the layer parameter to generate the noisy current value for the layer parameter.

19. One or more non-transitory computer storage media storing instructions that when executed by one or more computers cause the one or more computers to perform operations for training a neural network,
wherein the neural network is configured to receive a network input and to process the network input to generate a network output,
wherein the neural network comprises a plurality of layers each having respective layer parameters,
wherein one or more of the layers are noisy layers, and wherein the operations comprise:
  maintaining data specifying: (i) current values of each layer parameter of each of the plurality of layers and, iii) for each layer parameter of each noisy layer, a current value of a corresponding noise parameter for the layer parameter in addition to the current value of the layer parameter;
  obtaining a training network input;
  determining, for each layer parameter of each noisy layer, a respective noise value based at least in part on a respective random value that is sampled in accordance with a probability distribution;
  determining, for each layer parameter of each noisy layer, a noisy current value for the layer parameter from: (i) the current value of the layer parameter, (ii) the current value of the corresponding noise parameter, and (iii) the noise value, comprising:
    generating a noise modifier based on the current value of the corresponding noise parameter and the noise value; and
    applying the noise modifier to the current value of the layer parameter to determine the noisy current value for the layer parameter;
  processing the training input using the neural network in accordance with the noisy current values to generate a network output for the training input;
  determining a gradient of an objective function that depends on the network output with respect to the current values of the layer parameters and the current values of the noise parameters; and
  determining an update to the current values of the layer parameters and the current values of the noise parameters from the gradient.

20. The non-transitory computer storage media of claim 19, wherein
  applying the noise modifier to the current value of the layer parameter to determine the noisy current value for the layer parameter comprises:
    adding the noise modifier and the current value of the layer parameter to generate the noisy current value for the layer parameter.

21. A system comprising one or more computers and one or more storage devices storing instructions that when executed by the one or more computers cause the one or more computers to perform operations for selecting an action to be performed by a reinforcement learning agent interacting with an environment using a neural network, the neural network having a plurality of layers, each layer having a plurality of layer parameters, and the plurality of layers including one or more noisy layers, the operations comprising:
  maintaining data specifying: (i) current values of each layer parameter of each of the plurality of layers and, (ii) for each layer parameter of each noisy layer, a current value of a corresponding noise parameter for the layer parameter in addition to the current value of the layer parameter;
  obtaining an observation characterizing a current state of the environment;
  generating a network input for the neural network comprising the observation;
  determining, for each layer parameter of each noisy layer, a respective noise value based at least in part on a respective random value that is sampled in accordance with a probability distribution;
  determining, for each layer parameter of each noisy layer, a noisy current value for the layer parameter from: (i) the current value of the layer parameter, (ii) the current value of the corresponding noise parameter, and (iii) the noise value, comprising:
    generating a noise modifier based on the current value of the corresponding noise parameter and the noise value; and
    applying the noise modifier to the current value of the layer parameter to determine the noisy current value for the layer parameter;
  processing the network input using the neural network in accordance with the noisy current values to generate a network output for the network input; and
  selecting an action from a set of possible actions to be performed by the agent in response to the observation using the network output;
  wherein for each noisy layer, the layer parameters and the corresponding noise parameters have been trained to maximize a cumulative measure of rewards received by selecting actions to be performed by the reinforcement learning agent using network outputs generated by the neural network.

22. One or more non-transitory computer storage media storing instructions that when executed by one or more computers cause the one or more computers to perform operations for selecting an action to be performed by a reinforcement learning agent interacting with an environment using a neural network, the neural network having a plurality of layers, each layer having a plurality of layer parameters, and the plurality of layers including one or more noisy layers, the operations comprising:
  maintaining data specifying: (i) current values of each layer parameter of each of the plurality of layers and, (ii) for each layer parameter of each noisy layer, a current value of a corresponding noise parameter for the layer parameter in addition to the current value of the layer parameter;
  obtaining an observation characterizing a current state of the environment;
  generating a network input for the neural network comprising the observation;
  determining, for each layer parameter of each noisy layer, a respective noise value based at least in part on a respective random value that is sampled in accordance with a probability distribution;
  determining, for each layer parameter of each noisy layer, a noisy current value for the layer parameter from: (i) the current value of the layer parameter, (ii) the current value of the corresponding noise parameter, and (iii) the noise value, comprising:
    generating a noise modifier based on the current value of the corresponding noise parameter and the noise value; and applying the noise modifier to the current value of the layer parameter to determine the noisy current value for the layer parameter;

processing the network input using the neural network in accordance with the noisy current values to generate a network output for the network input; and selecting an action from a set of possible actions to be performed by the agent in response to the observation using the network output;

wherein for each noisy layer, the layer parameters and the corresponding noise parameters have been trained to maximize a cumulative measure of rewards received by selecting actions to be performed by the reinforcement learning agent using network outputs generated by the neural network.

* * * * *